United States Patent
Wagner et al.

(10) Patent No.: US 8,404,996 B2
(45) Date of Patent: Mar. 26, 2013

(54) SYSTEM FOR PRODUCING THIN-LAYER SOLAR CELL MODULES

(75) Inventors: Uwe Wagner, Weimar (DE); Stefan Acker, Waldeck (DE)

(73) Assignee: Jenoptik Automatisierungstechnik, Jena (DE)

( * ) Notice: Subject to any disclaimer, the term of this patent is extended or adjusted under 35 U.S.C. 154(b) by 646 days.

(21) Appl. No.: 12/621,092

(22) Filed: Nov. 18, 2009

(65) Prior Publication Data
US 2010/0122969 A1    May 20, 2010

(30) Foreign Application Priority Data

Nov. 18, 2008 (DE) .................. 10 2008 058 310

(51) Int. Cl.
*B23K 26/14* (2006.01)
(52) U.S. Cl. .............. 219/121.67; 219/121.76
(58) Field of Classification Search ........... 219/121.67–121.72, 121.76, 121.78; 65/105, 392; 29/35.5
See application file for complete search history.

(56) References Cited

U.S. PATENT DOCUMENTS

| 6,489,588 B1 | 12/2002 | Hoekstra et al. |
| 2007/0107252 A1* | 5/2007 | Kruckenhauser et al. ...... 34/402 |
| 2008/0105383 A1* | 5/2008 | Kubo et al. ............. 156/494 |

FOREIGN PATENT DOCUMENTS

| DE | 91 06 843.6 U1 | 10/1991 |
| DE | 199 33 703 A1 | 10/2000 |
| DE | 10 2005 027 800 A1 | 12/2006 |
| DE | 10 2006 033 296 A1 | 1/2008 |
| DE | 20 2008 005 970 U1 | 8/2008 |
| EP | 1 336 591 A2 | 8/2003 |
| WO | WO 96/20062 A1 | 7/1996 |

* cited by examiner

*Primary Examiner* — Khiem D Nguyen
(74) *Attorney, Agent, or Firm* — Duane Morris LLP

(57) ABSTRACT

A system for deleting the edges from coated substrates (6) and for separating said substrates into individual modules along the edge-deleted strips, wherein a laser scanner (2) for edge deletion and a laser head (9) for separating the substrate are disposed on opposite surfaces of the substrate (6) and, depending on the machine direction, can be positioned relative to each other, and their movement can be jointly controlled in such a manner that the laser scanner (2), in the machine direction, is always disposed at a fixed distance in front of the laser head (9), with two directions that are perpendicular to each other, preferably each with alternating directions of movement being available as machine directions.

11 Claims, 4 Drawing Sheets

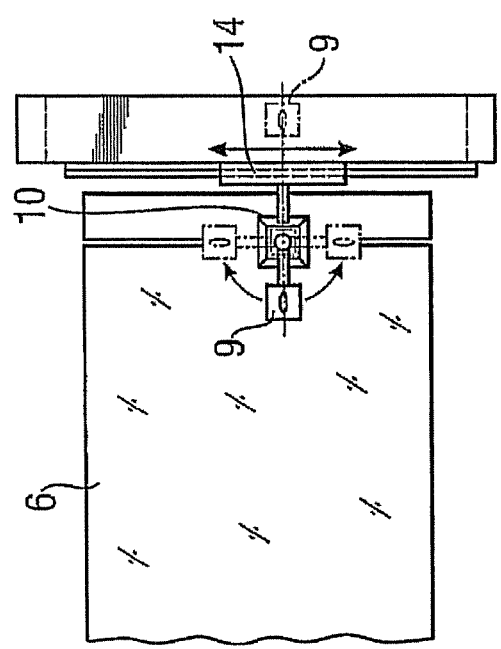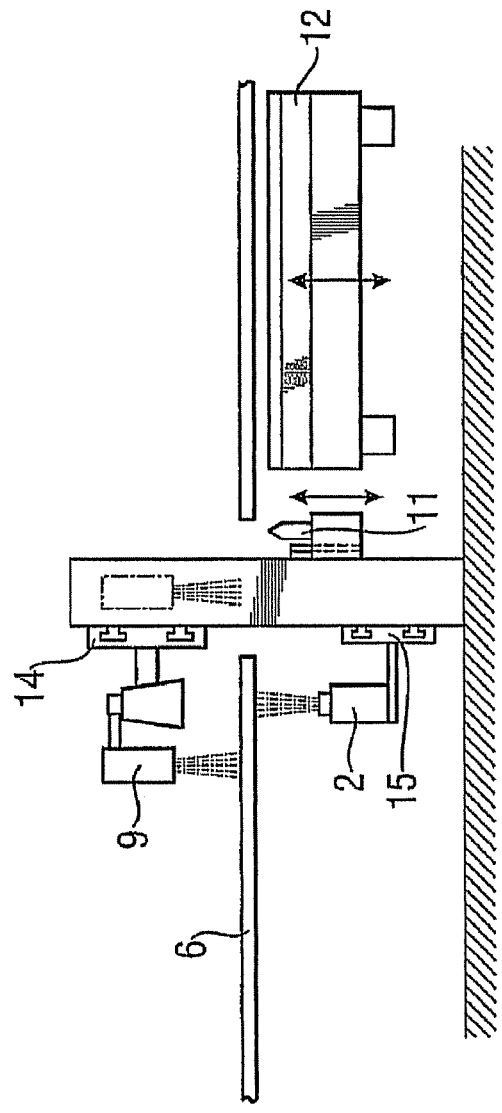
Fig. 3a
Fig. 3b

SYSTEM FOR PRODUCING THIN-LAYER SOLAR CELL MODULES

FIELD OF THE INVENTION

The present invention relates to a system for deleting edges from coated substrates and separating these substrates into individual modules along the edge-delete regions as is generically known from DE 91 06 843 U1.

Today, to produce thin-layer solar cell modules (modules), primarily glass substrate panels (substrates) are coated and structured before the coating along their edges (regions that form the edges of the individual modules) is removed and they are separated into individual modules and encapsulated, the dimensions of the substrates measuring a multiple of the dimensions of a module, e.g., 2.60 m×2.20 m.

BACKGROUND OF THE INVENTION

There are a number of different known methods of edge deletion and separation that are based on different techniques and invariably carried out one after the other at different machining stations within a production line, i.e., by means of different machines or systems.

This entails capital expenditure for two different machining stations, floor space for the two machining stations and, in addition to the process times required for edge deletion and separation, auxiliary process times for handling and alignment procedures that are required in both machining stations.

A machining station different from this type of machining station is disclosed in DE 91 06 843 U1.

The prior art used as the starting point in DE 91 06 843 U1 comprises a machining station in which raw glass panels are separated into a plurality of individual glass panes and a second machining station in which the individual glass panes are subjected to edge deletion.

Possible methods of edge deletion based on the prior art described in DE 91 06 843 U1 include a thermal method using an oxygen-acetylene flame and mechanical stripping methods using grinding and polishing disks or sandblasting.

The disadvantage is that, to carry out the two machining steps, i.e., separation and edge deletion, two separate machining stations are required.

DE 91 06 843 U1 proposes to depart from the previous principle of deleting the edges of the already cut finished individual glass panes and henceforth, prior to separating [the substrate] into the individual glass panes, to remove the coating from the raw glass panels in the regions in which the score lines and separation lines for the subsequent separation are located (edge strips).

Compared to the edge deletion of individual glass panes, this generally reduces the handling time. In addition, it is said to be possible to score and cut the individual glass panes and remove the coating in a single machining station of the production line.

In this machining station, the raw glass panel is stationarily attached to a horizontal or vertical bearing surface, and an abrasive tool is used to travel along the edge strips of the individual glass panes. After the coating has been removed from the machined regions, the raw glass panel can remain standing or lying, without changing its position, and the glass cutting wheel can subsequently travel along the same path that was followed during the abrasion step. Subsequently, the individual glass panes are separated. In this manner, it is possible to use the same control program and the same motion unit to carry out both machining procedures simply by changing the tool.

A system as disclosed in DE 91 06 843 U1 for removing the coating and for cutting comprises a machining bridge on which an abrasive tool and/or a cutting tool is/are disposed for exchangeable use.

First, the abrasive tool, which is preferably controlled by a computer, is moved along a predefined path that is determined by the location of the edge regions. Once the abrasion step has been concluded, the cutting tool travels the same path along the center line of the strips from which the coating has been removed. It is claimed that grinding and cutting can be carried out simultaneously, but no details are given.

Compared to machining in separate machining stations, a solution as disclosed in DE 91 06 843 U1 has the advantage that it requires less floor space and less capital expenditure, and it increases [sic] the cycle time by shortening the auxiliary process times for handling and alignment procedures.

Reducing the cycle time by shortening the total process time by performing the edge deletion operation at the same time or overlapping in time with the separation operation is possible only if the machining paths are always oriented in the same direction and if the tool always follows the same direction of movement. Only then are the abrasive tool and the scoring tool, which can be disposed movably in tandem one after the other on a bridge, in the required position relative to each other.

DE 20 2008 005 970 U1 discloses a method and a system for deleting the edges of thin-layer solar modules by means of a laser beam.

SUMMARY OF THE INVENTION

To implement this method, a pulsed laser beam is directed from the uncoated surface of the substrate onto the edge region from which the coating is to be removed. The laser beam has a rectangular cross section with relatively sharp edges and a uniform intensity distribution. Depending on the repeat rate of the laser pulses, the laser beam scans the edge region at such a speed that the laser beam sweeps across this entire edge region without considerable overlapping losses. The required relative movement between the laser beam and the thin-layer solar module is achieved by the superposition of a scanning motion of a scanner and a relative translational motion between the scanner and the thin-layer solar module along the direction of the center line of the peripheral edge. The material removed during the edge deletion is siphoned off as it forms.

To implement this method, a system with a permanently mounted laser station is disclosed, which laser station comprises a laser, a scanner and an optical system that are disposed in a compact housing. On the side of the laser station, a vacuum gripper of a buckling arm robot holds the thin-layer solar module in the center of its uncoated surface. The buckling arm robot is controlled in such a manner that the thin-layer solar module, under the beam exit opening of the laser station, moves at a constant speed along a path that corresponds to the peripheral center line of the edge. Underneath the thin-layer solar module, within the machining region, the funnel-shaped opening of a suction channel is disposed at a relatively short distance from the thin-layer solar module.

The system described in DE 20 2008 005 970 U1 is intended and suited only for edge deletion.

To separate a finished coated and structured substrate, from which the coating has been removed along the edge regions, a large number of mechanical and thermal methods and suitable systems to implement the methods are known.

Preferred are those methods in which, in a first machining step, a deep crack is generated along all desired separation lines, which deep crack, in a second machining step, is subsequently driven completely through the substrate to divide the substrate into individual modules. The deep crack can be produced, e.g., by means of a scoring wheel or a laser beam.

Laser methods in which the material is separated by provoking thermal stresses are based on the principle of limited local heating below the softening temperature of the material, which causes compression stresses to develop in the material, and of subsequent shock cooling by means of a directed coolant jet, which generates tensile stresses. The forces that develop in the material lead to a separation crack.

In addition to this type of a laser method, WO 96/20062 also discloses a system for implementing such a method.

The system comprises a radiation unit with a laser and a focusing system that is disposed along the optical axis of the laser, a mechanism that can be offset relative to the radiation unit and through which a coolant is introduced into the cutting zone, means with which the material to be cut is held in place, means for offsetting the laser and the coolant relative to the workpiece, and a control unit.

Many other publications describe methods by means of which the beam density distribution in the beam spot or the shape of the beam spot is optimized to improve the quality and speed of the separation process. Thus, the systems used to carry out the methods differ mainly with respect to the beam-forming and beam-focusing elements.

Generally, such systems have the following features in common:

A laser beam source, generally with controllable radiant power and beam duration. Depending on the laser, the emitting beam, in addition to a different wavelength and radiant power, can have, in particular, different shapes of the beam cross section and different beam density distributions.

A laser head comprising optical means for focusing the laser beam onto the surface of the workpiece. In isolated cases, these optical means can also be used to form the beam and to focus the beam and/or to change a beam density distribution.

Means for moving the laser head relative to the workpiece along a separation line.

A coolant container with a coolant nozzle which, in the machine direction, is disposed at a changeable or fixed distance behind the laser head.

A control system by means of which, inter alia, the laser head and the coolant nozzle connected to it are directed toward the separation line.

This type of system is known form DE 10 2005 027 800 A1, which is special in that it contains two cooling nozzles to make it possible to produce separation cracks in one orientation with changing directions of movement.

The TLS (Thermal Laser Separation) technique is generally suited only for brittle materials, in particular, glass substrates, which are uncoated or from which the coating has been removed in the region of the separation line. The surface of the substrate in the separation region should be free from residues and damage, which means, in particular, that no microcracks should be present.

Returning once more to DE 91 06 843 U1, which discloses a system for the edge deletion and separation of individual glass panes and is therefore the closest prior art to a system according to the present invention, it should be noted that this system has the disadvantage that edge deletion and separation in two orientations (x and y) that are perpendicular to each other with changing directions of movement is not simultaneously possible, as a result of which the processing time of the two separate procedures contributes to the length of the cycle time.

The problem to be solved by the present invention is to make available a system by means of which edge deletion and separation of a coated substrate along edge strips of modules to be cut can be simultaneously carried out in different orientations and with changing directions of movement.

This problem is solved with a system with the features of Claim 1. Other useful embodiments are described in the dependent claims.

It is an essential feature of the present invention that the system for edge deletion and separation comprises tools that can act from opposite surfaces upon the substrate. Thus, the tools that are to work in close proximity to each other on the substrate do not obstruct each other.

In addition, the position of these tools relative to each other can always be changed independently of each other and in such a manner that they do not obstruct each other so that in the machine direction, the tool for separating the substrate always follows the tool for edge deletion.

In this context, tools in the most general sense of the term are a laser head that directs a first laser beam exiting from a first laser beam source onto the substrate for cutting the substrate and a laser scanner for edge deletion that directs a second laser beam exiting from a second laser beam source onto the same substrate.

According to the present invention, for the edge deletion, the second laser beam is directed via a laser scanner onto the uncoated surface of the coated substrate. The scanner performs a scanning motion by means of which the first laser beam impinges upon the substrate at a predetermined scan angle perpendicular to the center line of the edge strip from which the coating is to be removed. The width of the edge strip that forms is determined by the scan angle and the distance of the laser scanner from the substrate.

In the x-direction, the relative movement between the second laser beam and the substrate in the direction of the center line of the edge strip is implemented by a linear movement of the substrate itself, which is positioned on a conveyor table, and in the y-direction, it is implemented by a movement of the laser scanner.

The second laser beam source used for edge deletion is preferably an Nd:YAG laser.

To generate a separation line along the center line of an edge strip, the first laser beam is directed via a laser head from the side of the coated surface onto the substrate. Preferably, a $CO_2$ laser is used as the first laser beam source. To separate the substrate, the relative movement in the direction of the separation crack along the center line of the edge strip in the x-direction is also implemented by a linear movement of the substrate itself, which is positioned on a conveyor table, and in the y-direction, it is implemented by a movement of the laser head.

The laser scanner and the laser head are disposed on two parallel bridges to be movable in the y-direction, with at least the upper bridge that carries the laser head being permanently mounted. The lower bridge that carries the laser scanner can either be mounted parallel to the upper bridge to be adjustable in different, preferably three, positions in the x-direction, or it can be permanently mounted, preferably rigidly connected to the upper bridge, and it preferably has a cross slide by means of which the laser scanner, in addition to being able to move in the y-direction, can also be moved into different positions in the x-direction.

To ensure that the waste products that form during the edge deletion can be removed, a suction apparatus with at least one suction funnel is included, which suction funnel is disposed at a predetermined distance from the laser head.

BRIEF DESCRIPTION OF THE DRAWINGS

By way of example, the system will be described in greater detail with reference to the drawing based on three practical examples.

As can be seen:

FIG. 1b is a schematic diagram of a lateral view of system seen in FIG. 1a,

FIG. 3b is a schematic diagram of a lateral view of the system seen in FIG. 3a, and

DESCRIPTION OF THE EMBODIMENTS

Figure 1A:
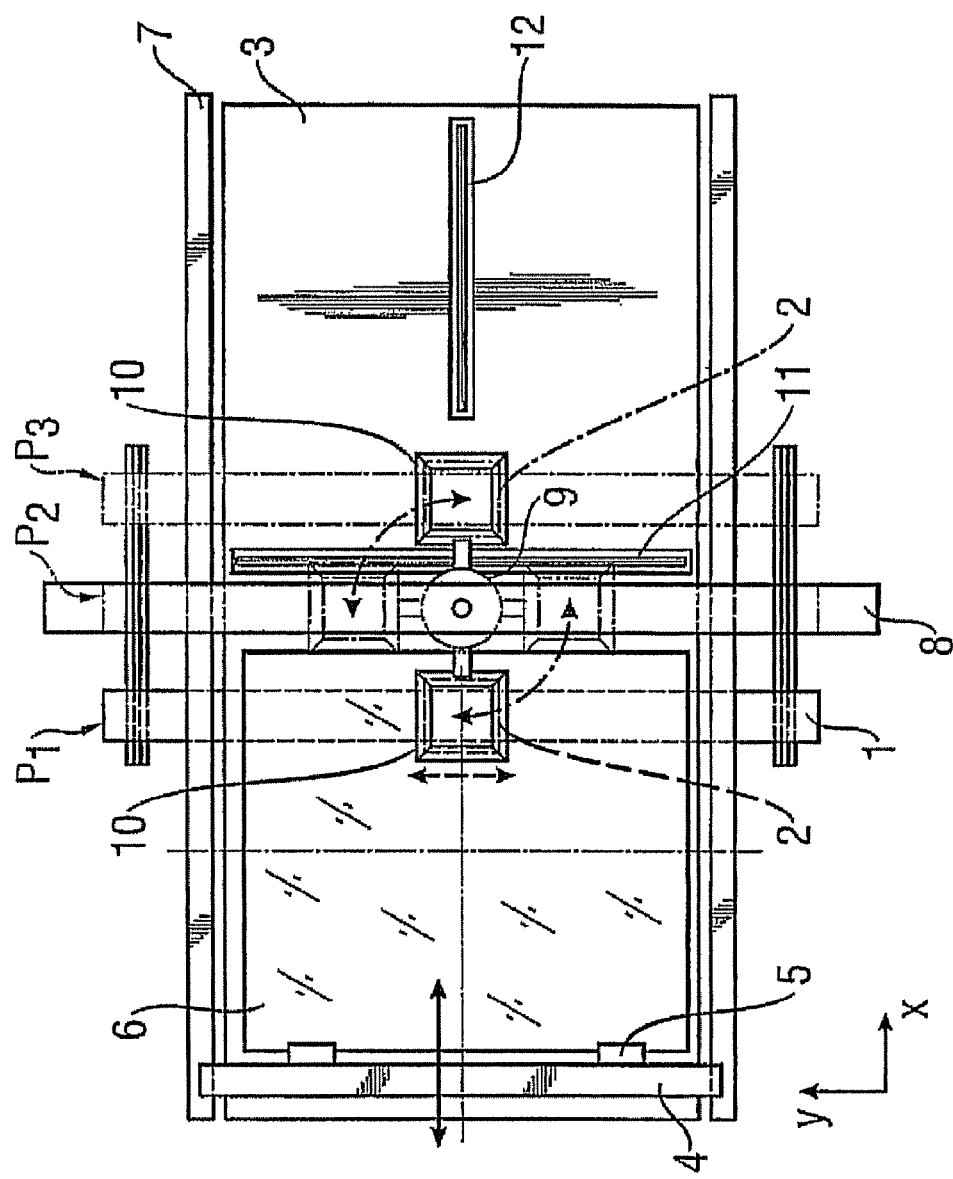
FIG. 1a is a schematic diagram of a top view of a first embodiment of a system.
Figure 1B:
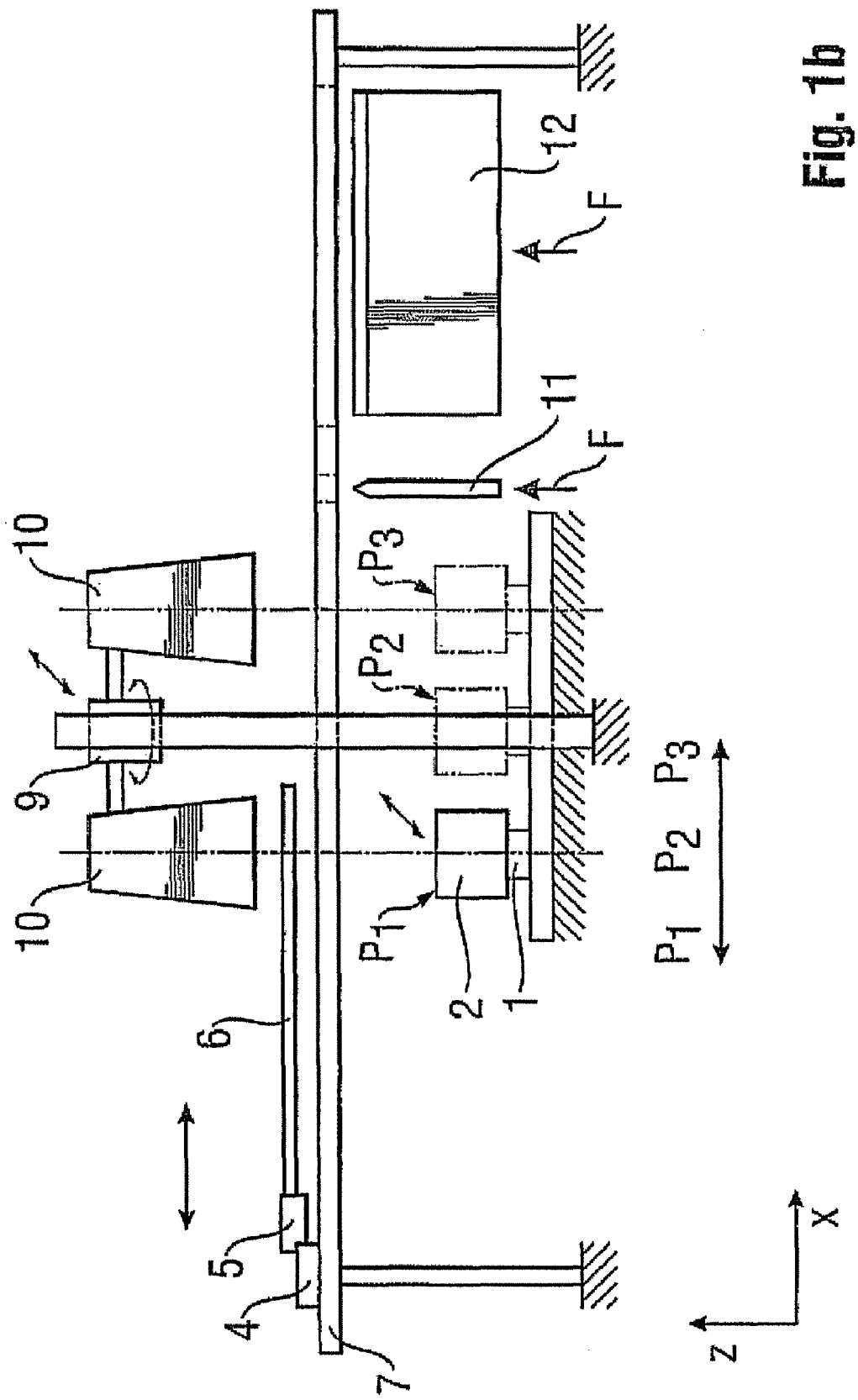

FIGS. 1a and 1b illustrate a first useful embodiment of a system disclosed by the present invention.

The system comprises a lower bridge 1 that is oriented in the y-direction of a Cartesian coordinate system shown, on which lower bridge a laser scanner 2 is disposed to be movable in the y-direction.

Above the lower bridge 1, a conveyor mechanism with a conveyor table 3 and a feeder bridge 4 with gripper units 5 is disposed.

In the bearing surface for substrate 6, the conveyor table 3 has recesses that correspond to the configuration and width of the edge strips and are oriented toward the upper bridge 8, thereby ensuring that a second laser beam exiting from the laser scanner 2 can impinge upon the substrate 6 without being obstructed.

A finished coated and structured substrate 6 (benefit) that is to be machined is positioned on the conveyor table 3 where it is held in position by at least two of the gripper units 5. The conveyor table 3, in conjunction with the feeder bridge 4, which can be moved along a linear guide 7 parallel to the lower bridge 1, is moved and, thus, transports the substrate 6 horizontally in the x-direction above the lower bridge 1.

In the center above the conveyor mechanism, an upper bridge 8 is disposed and oriented in the same direction as the lower bridge 1. Mounted on the upper bridge 8 is a laser head 9, which can swivel 90° and the end positions of which can be locked. Two diametrically oppositely disposed suction funnels 10 of a suction system (not shown) are rigidly connected to the laser head 9 so that, in the two end positions of the laser head 9, they are aligned with the laser head 9, either in the x- or in the y-direction. The openings of the suction funnels 10 are positioned as close as possible above the substrate 6, which rests on the table, so that the waste products forming during edge deletion can be siphoned off completely. Between the laser head 9 and the suction funnels 10, cooling nozzles are arranged; however, for reasons of clarity, these are not included in the drawing.

The drawing shows a first break-off knife 11 and a second break-off knife 12 that act, when targetedly lifted, with force F from the bottom upon the separation lines in the y-direction and in the x-direction to separate the substrate into the individual modules.

Not shown in the drawings are the two laser beam sources and the associated laser beam delivery systems to the laser scanner 2 and to the laser head 9. The drives and the control unit for the motor-driven movement of the laser head 9 and the laser scanner 2 and for the conveyor mechanism are also not shown in the drawing.

Below, the first embodiment of the system and how it functions, shown in FIGS. 1a and 1b, will be described.

Let us assume that a substrate 6 is to be separated according to FIG. 4 [sic] into four modules of equal size. Thus, the coating is removed from three edge strips in the x-direction, and from three edge strips in the y-direction, which edge strips all have the same width.

Along the center lines of the edge strips, simultaneously with the edge deletion operation, separation cracks are generated immediately after the edge deletion.

Only after all separation cracks have been generated is the substrate 6 separated along the separation cracks by the action of the break-off knives 11 and 12.

Instead of creating edge strips, all of which have the same width, it is also possible, in cases in which a peripheral separating cut is not required, i.e., where the edges of the substrate 6 are also used as the edges of the modules, to create peripheral edge regions that are only half as wide. The width of the edge strips can be varied simply by changing the scan angle.

To machine a substrate 6 with a system according to the first embodiment, the substrate is placed on the conveyor table 3 in the position seen in FIG. 1.

The substrate 6 is held in position by means of gripper units 5 and oriented with one edge parallel to the upper bridge 8.

When the laser head 9 is in the position shown in FIGS. 1a and 1b, which laser head is located midway along the length of the stationary upper bridge 8, and when the lower bridge 1 which is offset by a predetermined distance parallel to the upper bridge 8, is in position P1, with the laser scanner 2 also being located midway along the length of the lower bridge 1, edge deletion in the x-direction can be carried out across the center of substrate 6.

In the machine direction, the laser scanner 2 and the laser head 9 are located one behind the other, and a suction funnel 10 is positioned above the laser scanner 2.

The cross section of the first laser beam, in the machine direction, is preferably shaped like an elongated narrow ellipse, with which shape the person skilled in the art is familiar from a great number of methods based on the Thermal Laser Separation technique.

To remove the coating from the middle edge strip and generate the middle separation crack, the substrate 6, in cases in which both the laser scanner 2 and the laser head 9 are stationary, is passed between the two bridges 1,8 in the positive x-direction, so that machining takes place in the negative x-direction.

The procedure of edge deletion and generation of a separation crack is carried out, as is known from the prior art. A method for edge deletion by means of a laser beam is known, for example, from DE 20 2008 005 970 U1, and a method for generating a separation crack by means of a laser beam is known from WO 96/20062.

When the laser scanner 2 and the laser head 9 are in the same position relative to each other, machining in the negative x-direction is also possible by moving both by the same distance along the bridges 1,8 in the y-direction, which is implemented by jointly actuating the associated drives. To this end, the bridges 1,8 are fitted with guide rails on which slides 14,15 are guided, to which slides the laser head 9 and the laser scanner 2 are attached.

First, substrate 6 must be moved back into its starting position.

Machining can also take place in the opposite direction of movement, i.e., in the positive x-direction, in which case there is no auxiliary process time for moving the substrate 6 into its starting position. In this case, the lower bridge must be moved into position 3, offset by the predetermined distance parallel to the upper bridge 8, which causes the laser scanner 2 to be positioned, in the machine direction, in front of the laser head 9. In this position, the other suction funnel 10 is disposed above the laser scanner 2.

For machining in the y-direction, the laser head 9 is rotated 90°,

Thus, the elliptical beam spot is oriented in the machine direction, on the one hand, and the two suction funnels 10 are placed one behind the other in the machine direction.

The lower bridge 1 is now moved into position P2 directly below the upper bridge 8. Depending on whether the positive or negative y-direction is chosen as the machine direction, the laser seamier 2 must be positioned by the predetermined distance ahead of or behind the laser head 9.

For machining in the y-direction, the substrate 6 is stationarily held in place, and the laser scanner 2, followed by the laser head 9, is moved in the y-direction.

After the edge strips have been completely edge-deleted and scored, the substrate 6 is transported into a position above one of the break-off knives 11,12. The separation cracks are passed in the y-direction one after the other over the first break-off knife 11 which, when lifted, cuts into the substrate 6 until the substrate 6 breaks along the separation crack.

The separation cracks in the x-direction are broken by moving the second break-off knife 12 in the y-direction and lifting it successively under the separation cracks. Along the separation cracks, recesses are provided in the conveyor table 3 at least across the width of the edge, from which the coating has been removed. These recesses are required, on the one hand, to ensure that the laser beam exiting from the laser scanner 2 is able to penetrate the substrate 6 without being obstructed and, on the other hand, to allow the break-off knives 11,12, when lifted, to pass through the recesses. Thus, the recesses in the conveyor table 3 aid both the edge removal and the separation procedure.

Figure 2A:
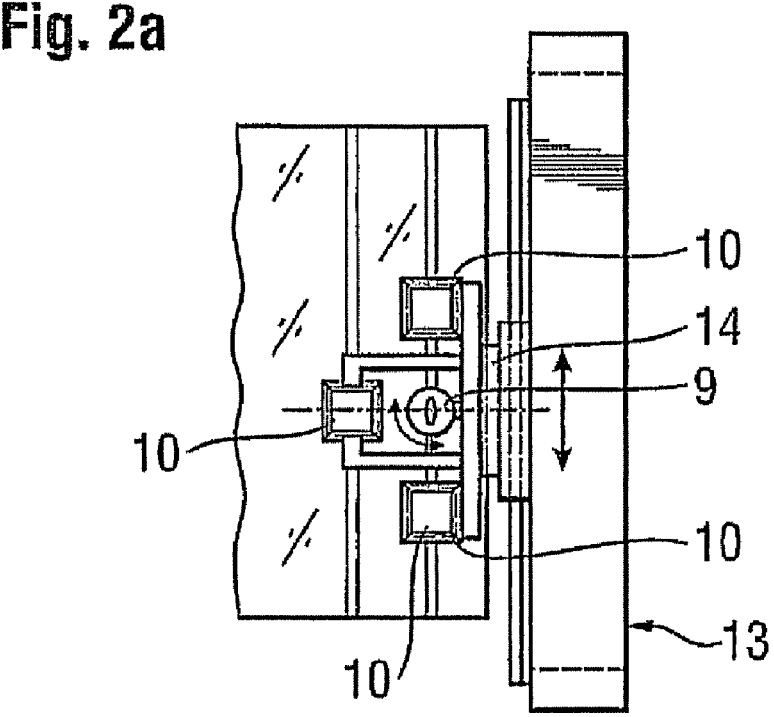
FIG. 2a is a schematic diagram of a top view of a second embodiment of a system.
Figure 2B:
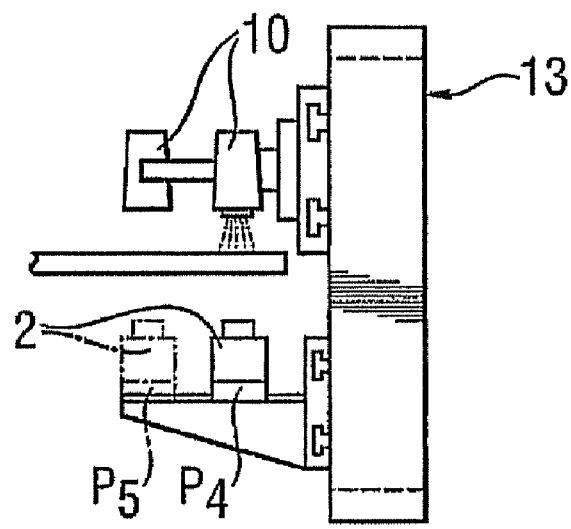
FIG. 2b is a schematic diagram of a lateral view of the system seen in FIG. 2a, FIG. 3a is a schematic diagram of a top view of a third embodiment of a system.

FIGS. 2a and 2b illustrate a second useful embodiment of a system as disclosed by the present invention. In contrast to the first embodiment, the lower bridge 1 is here rigidly connected to the upper bridge 8 and forms a frame 13 with the upper bridge.

On the upper slide 14, which is disposed on the upper bridge 8, three suction funnels 10, at equal distances from a laser head 9, are affixed, which laser head is disposed on the upper slide 14 to swivel 90°. Thus, in contrast to the first embodiment, the suction funnels 10 remain invariably in an unchanged position relative to the upper slide 14.

In contrast to the first embodiment of a system according to the present invention, the laser scanner 2 is not positioned on a single lower slide 15, which is guided in the y-direction on the lower bridge 1 but on a cross slide 16, which makes it possible to move it not only in the y-direction, but also into the two positions P4 and P5 in the x-direction. Thus, the laser seamier 2 can alternately be positioned below one of the three suction funnels 10, thus making it possible to machine the substrate 6 in the x-direction in one direction of movement and in the y-direction in changing directions of movement.

The advantage of this embodiment is that, when changing the direction, the suction funnels 10 need not be rotated with the leaser head 9, which means that the necessary connections within the suction means can have a simpler design.

In addition, this obviates the need for the guide for a movable lower bridge 1, which must be included in the first embodiment, and the previously necessary motor drive for the lower bridge 1 can be replaced with a considerably smaller drive for the x-axis of cross slide 16.

FIGS. 3a and 3b show a third embodiment of a system according to the present invention.

In this case, the laser scanner 2 is mounted on a lower slide 15, which can be moved in the y-direction on the lower bridge 1, which is again designed as a stationary bridge. The laser scanner 2 cannot move in the x-direction.

Stationarily mounted on the upper slide 14 is a single suction funnel 10, which is disposed at a fixed distance from a laser head 9, which can swivel 180°.

As in the second embodiment, substrate 6 can be machined in the x-direction in one direction of movement and in the y-direction in the other direction of movement.

By integrating an additional laser head 9 into the upper bridge 8, it might be possible for machining in the x-direction to be carried out with opposite directions of movement.

A system according to the present invention allows edge deletion, generation of separation cracks and final separation to be carried out by means of a single system.

LIST OF REFERENCE NUMERALS

1 Lower bridge
2 Laser scanner
3 Conveyor table
4 Feeder bridge
5 Gripper unit
6 Substrate
7 Linear guide
8 Upper bridge
9 Laser head
10 Suction funnel
11 First break-off knife
12 Second break-off knife
13 Frame
14 Upper slide
15 Lower slide
16 Cross slide While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A system for deleting edges from coated substrate and separating said substrate into individual modules along edge-deleted strips, comprising:
   a permanently mounted upper bridge,
   a bearing surface under the upper bridge on which said substrate is positioned and is oriented toward said upper bridge with a tool which is mounted on an upper slide, said slide being moveably disposed on the upper bridge for movement in the y-direction,
   at least one drive and a control unit connected to the drive, said tool being a laser head for directing a first laser beam from above onto said substrate, and at least one suction funnel of a suction unit disposed at a fixed predetermined distance from and near said laser head, a lower bridge disposed underneath said bearing surface parallel to said upper bridge, a laser scanner being disposed on said lower bridge under a suction funnel to be movable in the y-direction, said bearing surface being a conveyor table on which said substrate can be conveyed in the x-direction, said conveyor table having recesses that correspond to the edge strips so that a second laser beam exiting from the laser scanner can impinge from below upon said substrate without being obstructed, and a vertically movable first break-off knife disposed parallel to the upper bridge, and a vertically movable second break-off knife, at right angles thereto, that can be moved in the y-direction to break the substrate along generated separation cracks.

2. The system as in claim 1, wherein
said laser head can swivel 90° and has attached thereto two suction funnels diametrically opposite to each other, and
said lower bridge being moveable relative to said upper bridge by a predetermined distance in the x-direction in alternating directions of movement so that the laser scanner can be disposed relative to the laser head to be offset by the predetermined distance in the x-direction.

3. The system as in claim 1, wherein
said laser head is disposed to be able to swivel 90°,
and further comprising three suction funnels attached to the upper slide at a predetermined distance from the laser head,
said lower bridge being permanently mounted and forming a frame with the upper bridge, with the laser scanner being mounted on a cross slide on said lower bridge to offset it relative to said laser head in the x-direction.

4. The system as in claim 1, wherein
a suction funnel is stationarily mounted on the upper slide, and a laser head is disposed at the predetermined distance to be able to swivel 180° about said suction funnel, and
said laser scanner is mounted on a lower slide to be able to move only in the x-direction.

5. The system as in claim 1, wherein said at least one drive for individual movements are connected to a common control.

6. A system for deleting a coating of coated substrate from edges of said coated substrate thus forming edge strips and separating said substrate into individual modules along said edge strips after said edge strips have been completely edge deleted, comprising:

a permanently mounted upper bridge,
a bearing surface under the upper bridge on which said substrate is positioned and is oriented toward said upper bridge with a tool which is mounted on an upper slide, said slide being moveably disposed on the upper bridge for movement in the y-direction, at least one drive and a control unit connected to the drive,
said tool being a laser head for directing a first laser beam from above onto said substrate, whereby a cross section of the first laser beam is shaped like an elongated narrow ellipse, and at least one suction funnel of a suction unit disposed at a fixed redetermined distance from and near said laser head, a lower bridge disposed underneath said bearing surface parallel to said upper bridge, a laser scanner being disposed on said lower bridge under a suction funnel to be movable in the y-direction, whereby said laser scanner being a laser scanner that directs a second laser beam exiting from a second laser source and having a rectangular cross section with a uniform intensity distribution onto said substrate, said bearing surface being a conveyor table on which said substrate can be conveyed in the x-direction, and said conveyor table having recesses that correspond to the edge strips so that the second laser beam exiting from the second laser source can impinge from below upon said substrate without being obstructed.

7. The system as in claim 6, wherein
said laser head can swivel 90° and has attached thereto two suction funnels diametrically opposite to each other, and
said lower bridge being moveable relative to said upper bridge by a predetermined distance in the x-direction in alternating directions of movement so that the laser scanner can be disposed relative to the laser head to be offset by the predetermined distance in the x-direction.

8. The system as in claim 6, wherein
said laser head is disposed to be able to swivel 90°,
and further comprising three suction funnels attached to the upper slide at a predetermined distance from the laser head,
said lower bridge being permanently mounted and forming a frame with the upper bridge, with the laser scanner being mounted on a cross slide on said lower bridge to offset it relative to said laser head in the x-direction.

9. The system as in claim 6, wherein
a suction funnel is stationarily mounted on the upper slide, and a laser head is disposed at the predetermined distance to be able to swivel 180° about said suction funnel, and
said laser scanner is mounted on a lower slide to be able to move only in the x-direction.

10. The system as in claim 6, further comprising
a vertically movable first break-off knife disposed parallel to the upper bridge, and a vertically movable second break-off knife, at right angles thereto, that can be moved in the y-direction to break the substrate along separation cracks, which have been generated along center lines of said edge strips.

11. The system as in claim 6, wherein said drives are connected to a common control.

* * * * *